United States Patent [19]
Alfredsson

[11] Patent Number: 6,050,152
[45] Date of Patent: Apr. 18, 2000

[54] MOTOR VEHICLE GEARBOX

[75] Inventor: Sverker Alfredsson, Västra Frölunda, Sweden

[73] Assignee: AB Volvo, Gothenburg, Sweden

[21] Appl. No.: 09/142,504

[22] PCT Filed: Mar. 14, 1997

[86] PCT No.: PCT/SE97/00440

§ 371 Date: Sep. 10, 1998

§ 102(e) Date: Sep. 10, 1998

[87] PCT Pub. No.: WO97/34090

PCT Pub. Date: Sep. 18, 1997

[30] Foreign Application Priority Data

Mar. 15, 1996 [SE] Sweden .................................. 9601003

[51] Int. Cl.[7] .................................................. F16H 3/093
[52] U.S. Cl. ................................ 74/325; 74/331; 74/337
[58] Field of Search ............................ 74/325, 330, 331, 74/337

[56] References Cited

U.S. PATENT DOCUMENTS

| | | | |
|---|---|---|---|
| Re. 33,336 | 9/1990 | Bainbridge et al. ...................... | 74/330 |
| Re. 33,551 | 3/1991 | Andersson et al. ....................... | 74/331 |
| 2,599,801 | 6/1952 | Youngren et al. . | |
| 2,612,787 | 10/1952 | Youngren et al. . | |
| 4,461,188 | 7/1984 | Fisher ........................................ | 74/330 |
| 4,463,621 | 8/1984 | Fisher ........................................ | 74/330 |
| 4,738,149 | 4/1988 | Janiszewski ............................... | 74/330 |
| 4,876,907 | 10/1989 | Andersson et al. ....................... | 74/331 |
| 5,150,628 | 9/1992 | Alfredsson ................................ | 74/330 |
| 5,388,472 | 2/1995 | Alfredsson . | |
| 5,465,630 | 11/1995 | Iwamoto ................................... | 74/331 |
| 5,517,874 | 5/1996 | Janisjewski .............................. | 74/325 |
| 5,592,854 | 1/1997 | Alfredsson ................................ | 74/331 |
| 5,720,203 | 2/1998 | Honda et al. ............................. | 74/325 |
| 5,823,051 | 10/1998 | Hall, III ................................... | 74/325 |

*Primary Examiner*—Khoi Q. Ta
*Attorney, Agent, or Firm*—Young & Thompson

[57] ABSTRACT

Motor vehicle gearbox with two concentrically mounted input shafts (6, 9) each driving an individual lay shaft (12, 15), said lay shafts being located at different radial distances ($S_1$, $S_2$) from an output shaft. Opposite gears (16, 17, 18, 19) meshing in pairs with a common gear (21, 22) on the output shaft (20) have different numbers of teeth, due to the teeth of one gear being addendum modified in relation to the teeth of the other gear.

14 Claims, 1 Drawing Sheet

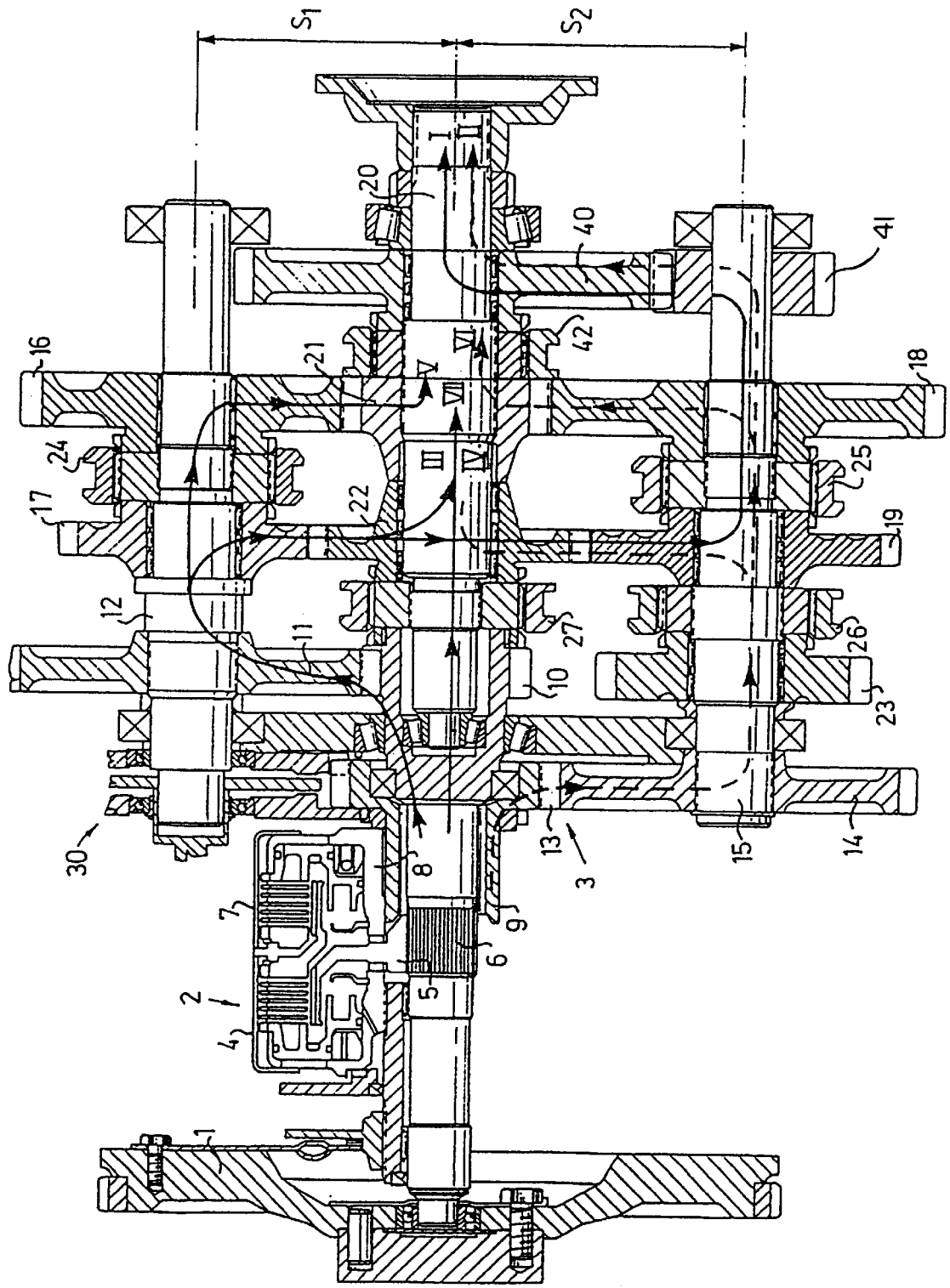

MOTOR VEHICLE GEARBOX

The present invention relates to a motor vehicle gearbox comprising two concentrically mounted input shafts, arranged to be driven alternately, and two lay shafts driven by the input shafts, the lay shafts having gears meshing with gears on an output shaft, and at least one gear being rotatably mounted on each lay shaft and lockable to its shaft by means of engaging means meshing with a common gear on the output shaft.

Double lay shafts are used in gearboxes in which it is desired, for a given gearbox length, to obtain more incremental gear speeds than what is practically possible in a conventional gearbox design with one lay shaft, and, in so-called power-shift gearboxes, i.e. gearboxes with double input shafts, each driven by an individual clutch. In such gearboxes, the gear positions are preselected, whereafter the actual shifting is done by releasing one clutch and engaging the other clutch. There are two main types of known gearboxes with double lay shafts. In one type, gears on the two lay shafts engage, in pairs, common gear on the outward shaft. In the second type, each lay shaft gear engages an individual gear on the outward shaft. Common to these two types, which are shown and described in SE 8003158-6, is that the lay shafts are the same radial distance from the main shaft. Both have advantages and disadvantages. The advantage of arranging pairs of lay shaft gears meshing with a common gear on the output shaft is that the gearbox can be dimensioned with minimum length for a given number of gear speeds. The disadvantage is however, that the lay shaft gears in the respective pairs must be the same size, which limits the freedom in selecting incremental between gear speeds. The second type provides maximum freedom in regard to the selection gear speed steps, but requires, for the same number of gear speeds, that the axial dimension of the gearbox be larger.

Gearboxes of the first type, which are particularly intended for heavy vehicles, such as trucks and other work vehicles, which require a very high gear ratio in the lowest gear speeds, have very small diameters, due to the design of the gearbox, for the lay shaft gears for the lowest gear speeds. When these are releasably mounted on their shafts they must be mounted on needle bearings, which, for the small diameters in question, result in thin gear hubs and consequently limited torque which can be transmitted.

SE-A-8700583 shows and describes a gearbox which has lay shaft gears for second and third gear speeds releasably mounted on their shafts and engaging a fixed gear on the main shaft. The lay shaft gear for first gear has, however, a gear ring cut directly in the lay shaft, which means that it can be made with a very small diameter and still transmit a large torque. This design requires, however, that the releaseable gear for first gear be mounted on the output shaft.

The purpose of the present invention is to achieve a gearbox of the type described by way of introduction which, while retaining the advantage of minimizing dimensions described above, provides greater freedom as regards the selection of incremental gear speeds and placement of the releasable gears for the lower gear speeds.

This is achieved according to the invention by virtue of the fact that corresponding gears mounted on the lay shafts and which share a common gear on the output shaft, each have different numbers of gear teeth.

Such a design can be achieved according to the invention in practice, on the one hand, by disposing the lay shafts at different radial distances from the output shaft and, on the other hand, by employing so-called "addendum modification" of the gears which provides for a different number of gear teeth to give greater flexibility in selecting gear increments, as subsequently discussed.

In the previously known gearboxes with opposing gears of equal size on the lay shafts, the gear speed increments between subsequent gear speeds, for example between third and fourth, were exclusively dependent on the difference in gear ratio between the primary gear rings of the lay shafts, i.e. the interengaging gears on the respective input shaft and the respective lay shaft. The invention introduces two additional variables for affecting the difference in gear ratio between the various gear speeds. An additional advantage achieved by placing the lay shafts supporting the gears for the lowest gear speeds at a greater distance from the output shaft is that these gears can be made with greater diameter than previously and can therefore, be provided with needle bearings and engaging means which can be advantageous in certain cases.

The invention will be described in more detail with reference to examples shown in the accompanying drawing, where the FIGURE shows a longitudinal section through a seven speed motor vehicle gearbox.

In the FIGURE, the numeral 1 designates an engine flywheel which via a multi disc wet disc clutch, generally designated 2, drives a gearbox 3 according to the invention. The clutch 2 is a double clutch of a type known per se and therefore does not need to be described in more detail here. The left hand clutch 4 seen in FIGURE is coupled via a sleeve element 5 to a first input shaft 6 in the gearbox, while the right hand clutch unit 7 is coupled via a sleeve element 8 to a second input shaft 9 in the form of a hollow shaft mounted concentrically with the first shaft 6. The two clutch units can be alternately engaged and disengaged to ultimately drive the input shafts 6 and 9. The wet disc clutch shown can be replaced by a double dry disc clutch.

The first input shaft 6 is provided with a gear ring 10 which meshes with a gear 11 which is fixedly mounted on a first lay shaft 12. The second input shaft 9 is provided with a gear ring 13 which meshes with a gear 14 which is fixedly mounted on a second lay shaft 15. The gear ratio between the gears 10, 11 is greater than the gear ratio between the gears 13, 14, which means that the second lay shaft 15 rotates more rapidly than the first lay shaft assuming the same rotational input speed is provided to each respective input shaft. The rotational axes of the lay shaft 12, 15 are located at radial distances $S_1$ and $S_2$ respectively from the rotational axis of the output shaft 20. The distance $S_2$ can be 1–6% greater than the distance $S_1$. In the example shown, the difference is 3%. The lay shafts 12 and 15 each carry a pair of freely rotatably mounted gears 16, 17 and 18, 19 respectively, of which the gears 16, 18 both mesh with the gear 21 fixedly joined to the output shaft 20. The gears 17, 19 engage a freely rotatable gear 22 provided with engaging teeth, mounted on the output shaft. The gears 16, 17, 18 and 19 can, through addendum modification, be given a number of teeth which differs from what can be achieved without addendum modification, and this can be utilized for more freedom in selecting gear increments. The shafts are arranged in V-shape to make it possible, with an extra gear 23 on the lay shaft 15 meshing with the gear 11 on the lay shaft 12, to reverse the rotational direction of either lay shaft for reverse gear. It is also possible to reverse the rotational direction of the respective lay shaft by means of a gear mounted on a separate shaft in the housing meshing with the gear rings at 10 and 11. This provides a freer selection of V-shape and gear ratio, and also permits the shafts to be placed in the same plane. The gears 16, 17, 18, 19 and 23 can be locked to their shafts with the aid of axially displaceable engaging sleeves 24, 25 and 26. A gear 40 which is freely rotatably mounted on the output shaft 20, meshes with a gear 41 fixed on the lay shaft 15, and is lockable to the shaft 20 by means of an engaging sleeve 42. Alternatively, the gear 40 can be fixed to the output shaft 20 and the gear 41 be provided with engaging means. With the aid of an engaging sleeve 27, the free running gear 22 can be locked to the output shaft, and the input shaft 6 and the output shaft 20 can be locked together for direct drive. All of these engaging means lack individual conventional synchronizing devices.

In the embodiment shown, the engaging sleeves 24, 25, 26, 27 and 42 lack cooperating synchronizing devices. Instead, there is a so-called central synchronization, arranged generally designated 30, which is of the type shown and described in SE-A-8700583, and which does not constitute a part of the present invention. For a more detailed description of the shifting process itself when using central synchronization, reference is made to the above mentioned specification. It is of course to be understood that the gearbox described here and shown in the accompanying drawing as an alternative to the central synchronization, can be provided with individual synchronizations of conventional type for each engaging sleeve.

In the FIGURE, the gearbox is shown in the neutral position with all of the releasable gears released from their shafts. Arrows mark the power flow from the input shafts 6 and 9 to the output shaft 20 when driving in the various gear speeds.

I claim:

1. An engine vehicle gearbox, comprising:

two concentrically mounted input shafts arranged to be driven alternately;

two lay shafts driven by said input shafts;

a first gear on a first one of said two lay shafts and a second gear on a second one of said two lay shafts;

a common gear on an output shaft that meshes with both said first and second gears;

engaging means for locking said first and second gears to the respective one of said lay shafts;

said first and second gears having a different number of teeth.

2. The gearbox according to claim 1, wherein said two lay shafts are disposed at different radial distances ($S_1$, $S_2$) from said output shaft.

3. The gearbox according to claim 1, wherein the one of said first and second gears which has the highest rotational speed at a given input rotational speed has at least one tooth more than the other of said first and second gears.

4. The gearbox according to claim 1, wherein one of said two lay shafts which has the highest rotational speed of said two lay shafts at a given input rotational speed is located at a greater radial distance from said output shaft than the other one of said two lay shafts.

5. An engine vehicle gearbox, comprising:

a first and a second input shaft, said first and said second input shafts being concentrically mounted and arranged to be driven alternately;

an output shaft; and a first and a second lay shaft driven by said first and said second input shafts, respectively, said first and said second lay shafts each having a plurality of gears meshing with a corresponding plurality of gears on said output shaft, wherein said plurality of gears comprises, a first rotatable gear on said first lay shaft engaging a first common output shaft gear on said output shaft, a second rotatable gear on said second lay shaft engaging said first common output shaft gear, said first rotatable gear and said second rotatable gear having a different number of gear teeth engaging means for locking said first rotatable gear and said second rotatable gear to said first lay shaft and said second lay shaft, respectively.

6. The gearbox of claim 5, wherein said plurality of gears further comprises:

a third rotatable gear on said first lay shaft engaging a second common output shaft gear on said output shaft; and a fourth rotatable gear on said second lay shaft engaging said second common output shaft gear, said third rotatable gear and said fourth rotatable gear having a different number of gear teeth.

7. The gearbox of claim 6, further comprising engaging means for locking said third rotatable gear and said fourth rotatable gear to said first lay shaft and said second lay shaft, respectively.

8. The gearbox of claim 6, wherein said fourth rotatable gear has at least one more gear tooth than said third rotatable gear.

9. The gearbox of claim 5, wherein said second rotatable gear has at least one more gear tooth than said first rotatable gear.

10. The gearbox of claim 5, wherein said first common output shaft gear is a rotatable gear.

11. The gearbox of claim 10, further comprising engaging means for locking said first common output shaft gear to said output shaft.

12. The gearbox of claim 5, wherein said first common output shaft gear is fixedly attached to said output shaft.

13. The gearbox of claim 5, wherein said second lay shaft has a higher rotational speed than said first lay shaft for a given respective input shaft rotation speed, and wherein a second radial distance from said second lay shaft to said output shaft is greater than a first radial distance from said first lay shaft to said output shaft.

14. An engine vehicle gear box, comprising:

two concentrically mounted input shafts, arranged to be driven alternately;

first and second lay shafts driven by said two concentrically mounted input shafts, said first and second lay shafts each having a plurality of gears meshing with a plurality of corresponding gears on an output shaft, each of said first and second lay shafts having at least one of said plurality of gears rotatably mounted thereon; and an engaging means for locking said at least one of said plurality of gears to a respective one of said first and second lay shafts, said at least one of said plurality of gears on each of said first and second lay shafts being meshed with each other through a common gear on said output shaft, each of said at least one of said plurality of gears on each of said first and second lay shafts having a different number of gear teeth, said two lay shafts being disposed at a first radial distance and a second radial distance, respectively, from said output shaft.

* * * * *